United States Patent [19]

Blaurock et al.

[11] Patent Number: 5,553,945

[45] Date of Patent: Sep. 10, 1996

[54] LINEAR GUIDING APPARATUS FOR GUIDING AN OBJECT

[75] Inventors: Werner Blaurock, Niederwerrn; Rudolf Schlereth, Frauenroth; Ulrich Wehrhahn, Würzburg; Ernst Albert, Sand/Main; Günter Blaurock, Niederwerrn, all of Germany

[73] Assignee: Deutsche Star GmbH, Schweinfurt, Germany

[21] Appl. No.: 351,261

[22] PCT Filed: Jun. 8, 1993

[86] PCT No.: PCT/EP93/01443

§ 371 Date: Nov. 30, 1994

§ 102(e) Date: Nov. 30, 1994

[87] PCT Pub. No.: WO93/25823

PCT Pub. Date: Dec. 23, 1993

[30] Foreign Application Priority Data

Jun. 12, 1992 [DE] Germany ............ 42 19 340.0

[51] Int. Cl.⁶ .................................................. F16C 29/06
[52] U.S. Cl. .................. 384/45; 384/10; 384/99
[58] Field of Search .................. 384/45, 10, 99, 384/43, 44, 7

[56] References Cited

U.S. PATENT DOCUMENTS

| | | |
|---|---|---|
| 5,013,164 | 5/1991 | Tsukada . |
| 5,161,896 | 11/1992 | Höfling et al. . |
| 5,273,367 | 12/1993 | Tanaka ................................ 384/45 |

FOREIGN PATENT DOCUMENTS

| | | |
|---|---|---|
| 0393201 | 10/1990 | European Pat. Off. . |
| 0391072 | 10/1990 | European Pat. Off. . |
| 0422419 | 4/1991 | European Pat. Off. . |
| 0472167 | 2/1992 | European Pat. Off. . |
| 8003149 | 9/1980 | France . |
| 2442329 | 4/1975 | Germany . |
| 2607674 | 9/1976 | Germany . |
| 2837374 | 3/1979 | Germany . |
| 3245124 | 6/1983 | Germany . |
| 3607479 | 12/1986 | Germany . |
| 8903980 | 6/1989 | Germany . |
| 8910548 | 12/1989 | Germany . |
| 3931397 | 3/1991 | Germany . |
| 4104717 | 8/1991 | Germany . |
| 4110131 | 10/1991 | Germany . |
| 4121559 | 1/1992 | Germany . |
| 4041269 | 3/1992 | Germany . |
| 52-37675 | 3/1977 | Japan . |
| 58-6010 | 12/1983 | Japan . |
| 61-116119 | 6/1986 | Japan . |
| 61-236919 | 10/1986 | Japan . |
| 62-292922 | 12/1987 | Japan . |
| 2-51617 | 2/1990 | Japan . |
| 2164708 | 3/1986 | United Kingdom . |
| 2164709 | 3/1986 | United Kingdom . |

OTHER PUBLICATIONS

Schwingungen dampfen—aber richtig!, Nov. 1989.
Hansjürgen Saechtling, "Kunststoff–Taschenbuch" (21st Edition), 1979.
Brochure "Schwingungen daempfen", INA–Sonderdruck, Nov. 1989.

*Primary Examiner*—Lenard A. Footland
*Attorney, Agent, or Firm*—Brumbaugh, Graves, Donohue & Raymond

[57] ABSTRACT

A linear guiding apparatus for guiding an object, comprising a rail system and a first partial group of object-guiding rail runner elements primarily responsible for the guiding precision of the object, which first partial group comprises at least one group member, the guiding rail runner elements being guided in a moving direction along associated roller paths of the rail system by rolling member loops mounted on the guiding rail runner elements, a second partial group of damping elements guided along the rail system, connected with the object and being primarily responsible for the damping of vibrations directed transversely to the moving direction being additionally provided between the object and the rail system, which second partial group comprises at least one group member, the damping elements differing from the guiding rail runner elements with respect to the internal structure and/or with respect to the mounting relationship between the object and the rail system.

61 Claims, 12 Drawing Sheets

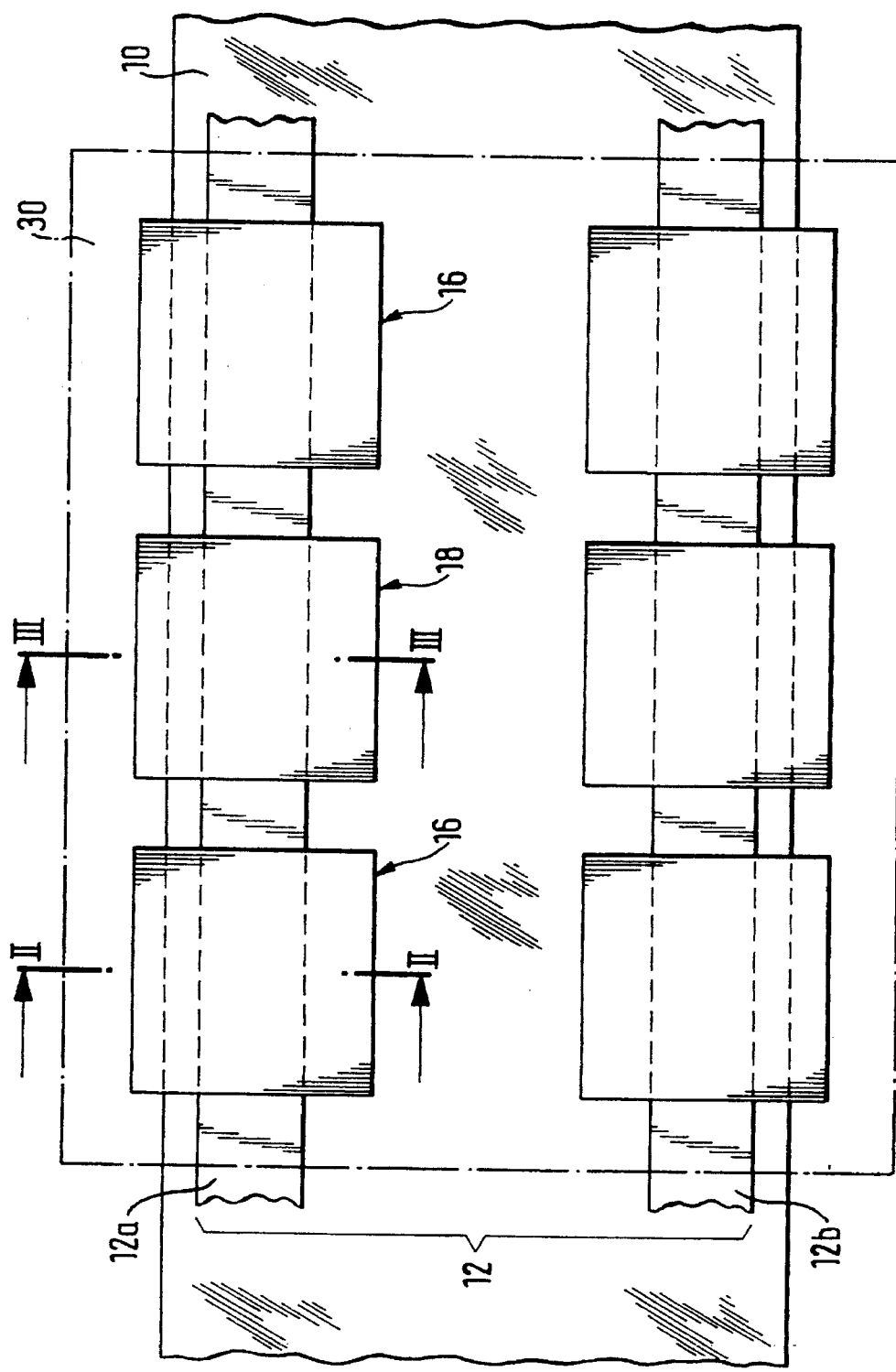

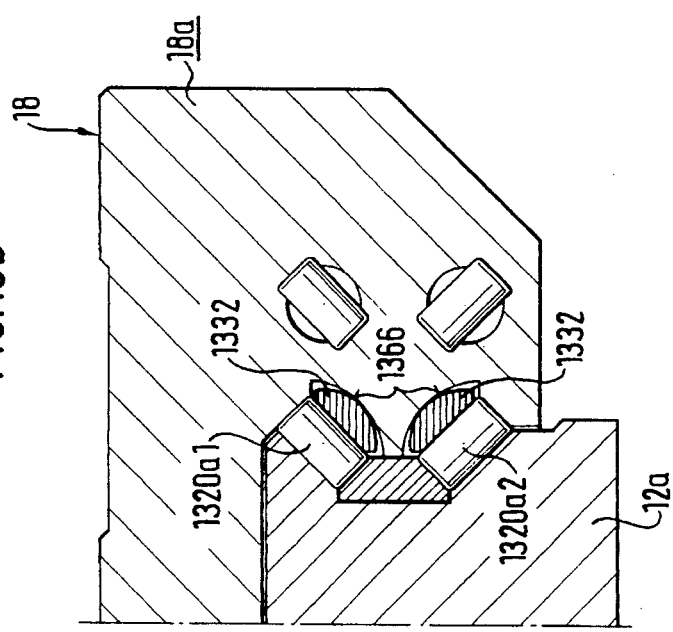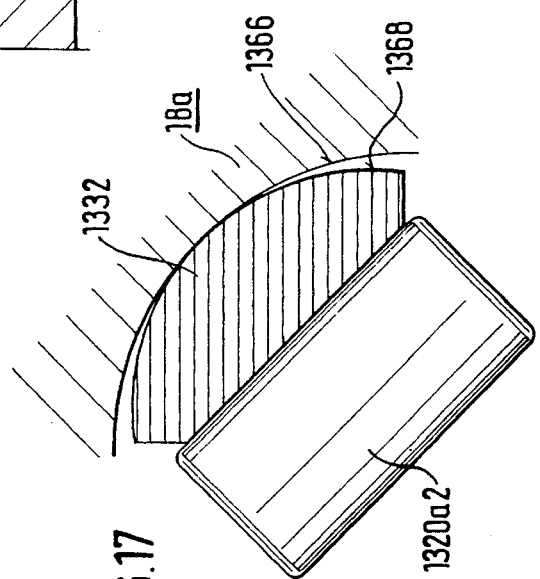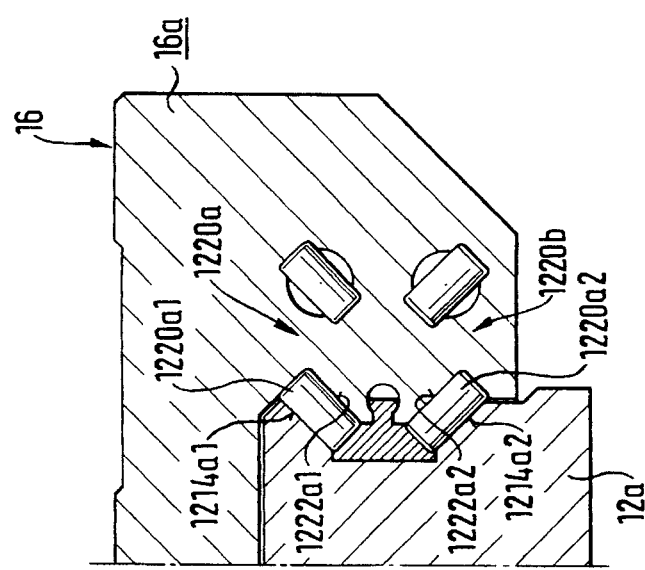

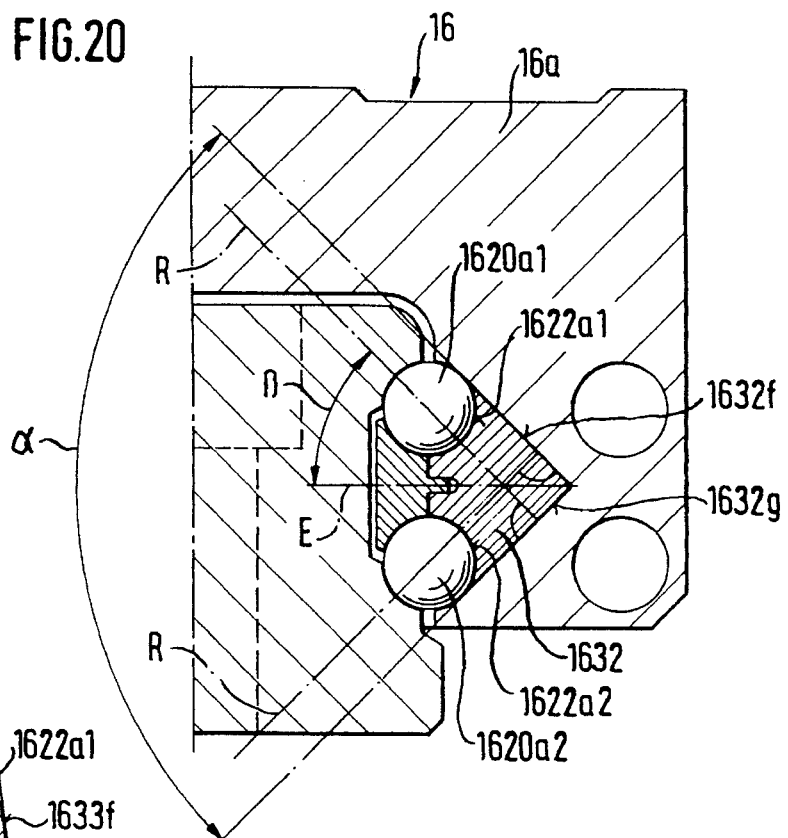
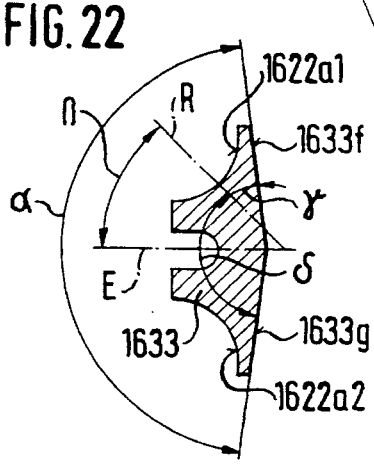
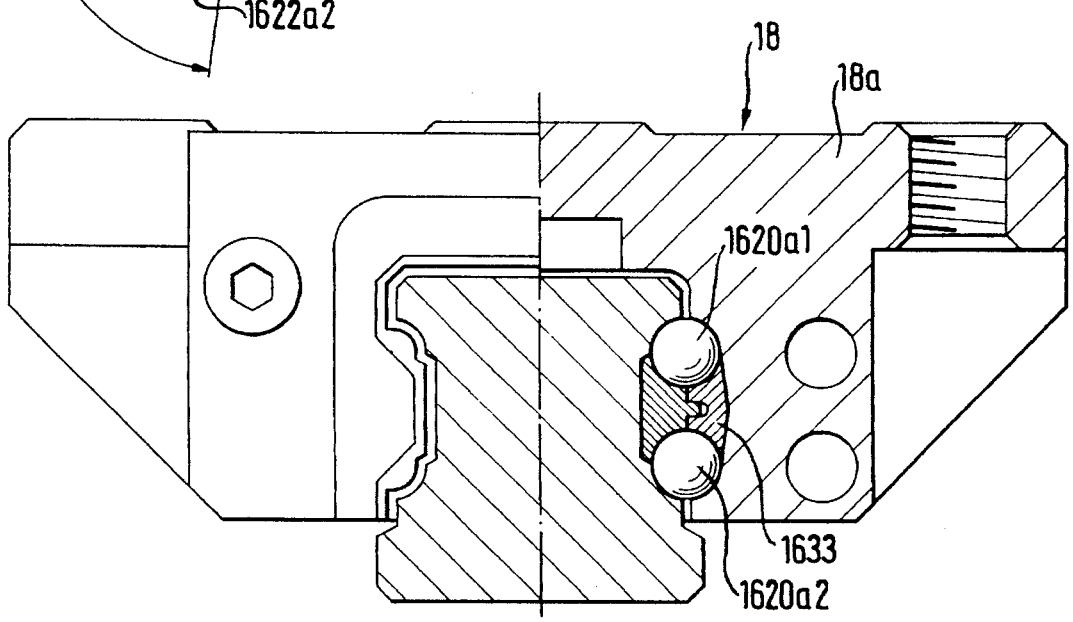

LINEAR GUIDING APPARATUS FOR GUIDING AN OBJECT

The present invention relates to a linear guiding apparatus for guiding an object, comprising a rail system and a first partial group of object-guiding rail runner elements—hereinafter referred to as guiding rail runner elements—primarily responsible for the guiding precision of the object, which first partial group comprises at least one group member, said guiding rail runner elements being guided in a moving direction along associated roller paths of the rail system by rolling member loops mounted on the guiding rail runner elements, a second partial group of damping elements guided along the rail system, connected with the object and being primarily responsible for the damping of vibrations directed transversely to the moving direction being additionally provided between the object and the rail system, which second partial group comprises at least one group member, said damping elements differing from the guiding rail runner elements with respect to the internal structure and/or with respect to the mounting relationship between the object and the rail system.

The object to be guided may have any shape and may serve for any purpose. The object to be guided may especially be the table of a machine tool, which table may be adapted for the fastening of tools or workpieces. Further, the object to be guided may be the table of a measuring device, e.g. of a machine tool, which table carries a measuring head.

The rail system may comprise one or a plurality of rails which are mounted on a common base or on a common pedestal. There is far-reaching liberty concerning the design of the rails. Besides circular rails, especially and preferably profile rails are used.

If hereinafter the term rolling member is used, there are principally involved balls, cylindrical needles and rollers whose surface, when viewed from radially outwardly, exhibit convex or concave generatrices. The rail runner elements must of course be adapted to the respective profile configuration of the rail or rails, respectively. An especially preferred combination of a rail and a rail runner element is seen in a profile rail having a bottom face for attachment to a pedestal, a top face and two side faces; rolling member roller paths may be provided on the side faces and on the top face. Accordingly, the rail runner element will then have U-shape with a web adjacent the rail top face and with legs, one each being provided opposite of a side face of the respective rail.

In many cases, transverse loads and moments between the object and the rail system must be transmitted in transverse planes vertical to the moving direction. The arrangement of the roller paths along the rail or rails, respectively, and the arrangement of the transverse load transmitting or moment transmitting rolling member rows, respectively, of the individual rolling member loops is then selected such that the rolling member loops can stand the transverse load and moments to be expected while maintaining the necessary precision. Frequently, the roller paths and the arrangement of the rolling member loops in the rail runner elements will be selected such that in a transverse plane orthogonal with respect to the moving direction transverse loads can be transmitted in any direction and thus also any moments about the moving direction. If the rail system is formed by a plurality of rails, it is also possible that only on one rail transverse loads can be transmitted in all directions within a transverse plane, whereas on another rail transverse loads can only be transmitted in one direction, so that the arrangement is generally relatively unsensitive to deviations in parallelism of the rails.

With all these guiding systems, there is frequently demanded an utmostly precise positioning of the object with respect to the rail system in view of the necessary precision of treating and/or measuring operations. This means that the guidance of the object with respect to the rail system in a plane orthogonal to the moving direction must be definite and rigid.

It has been found that even in case of definite and rigid support of the object on the rail system there may frequently occur vibrations of the object with respect to the rail system, especially if the rail system or/and the object are connected in a vibration transmitting manner with a device comprising mobile components, e.g. a machine tool. On the basis of these findings, there have already been developed various solutions in order to damp possible vibrations and render them harmless without limiting definiteness and rigidity of the guidance of the object relative to the rail system.

It is known from DE-U 89 03 980 and from a publication "INA special issue in KEM No. 11, November 1989, Konradin publishing company" to guide an object on a guide rail by means of two guide carriages which are guided on the guide rail by roll bodies, and to provide in addition to these guide carriages between the guide rail and the object a damping element in the form of a slide embracing the guide rail, the inner contour of the damping slide being substantially adapted to the profile of the guide rail such that a damping gap of from 0 to 40 µm is defined between the damping slide and the guide rail, which damping gap may be filled with oil. It is to be noted that no rolling members are provided between the damping slide and the guide rail.

Further, it is known from DE-A1 41 21 559 to provide at one end portion at least of a guide carriage guided on a guide rail by rolling members a vibration damping block which is in frictional contact with a friction surface provided on the rail.

Further, it is known from DE-A 41 04 717 to use for the damped guidance of an object on a rail in addition to one or several alignment units operating according to the principle of rolling member engagement sliding guide elements having no antifriction bearings; these sliding guide elements may be elastic hollow bodies which are filled with a pressurized liquid and which in turn abut against a friction surface of the respective rail. According to this publication, in the area of the friction bearings there is no rolling engagement between the object to be guided and the rail, either.

Further, it is known from DE-A1 41 10 131 to provide an alignment unit with a combination of antifriction bearing alignment units and sliding contact units, wherein the sliding guide units are in sliding contact with sliding surfaces of the rail. Particularly an elastic, corrugated spring material, a rubber material or a plastic material may be provided on the sliding guide element, which material is in frictional engagement with one or a plurality of sliding surfaces of the rail. Again, rolling engagement is limited to the area of the antifriction bearing units, whereas in the area of the sliding guide units there is only sliding and frictional contact with the guide rail.

Further, it is known from Japanese publications 58-6010 (6907-3J of Jan. 14, 1983) and 61-116 119 (6528-3J of Jun. 03, 1986) to equip sliding guide elements which are guided in rolling engagement with guide rails additionally with frictional damping elements which engage friction surfaces of the guide rail.

Further, it is known from EP 472 167 A2 to mount to a rail runner element the supporting sections of rolling member loops on track inserts which engage the respective main body of the rail runner element oscillatingly and frictionally slidingly, the respective track insert being elastically deformable. This is particularly to ensure a self-adjustment of the bearing in the sense of increased osculation and reduced surface pressures. As far as a damping function is intended, also this publication provides the use of lubricant cushions.

Also the present invention relates to the problem of vibration damping. It is the object of the present invention to achieve a vibration damping, especially transverse to the running axis, i.e. in one or a plurality of directions within a transverse plane orthogonal to the running axis, which vibration damping is not or not exclusively based upon the principle of frictional engagement between the rail runner elements and the rail system.

For solving this problem, this invention suggests that a) at least one damping element—hereinafter referred to as damping rail runner element—is also guided on roller paths of the rail system by rolling member loops mounted on the damping rail runner element, which roller paths are also associated with the first partial group of guiding rail runner elements, and b) that the damping characteristics of this damping rail runner element are determined by transverse load transmitting means provided in the transverse load transmission path between the rolling members of the respective damping rail runner element and the object.

The term partial groups is to be understood in such sense that a partial group may consist of one or a plurality of rail runner elements.

So, in the embodiment according to the present invention, both the primarily guiding rail runner elements as well as the primarily damping rail runner elements are in rolling engagement with the roller paths of the rail system. This means that on the rail system principally the same roller paths may be used for the primarily damping rail runner elements, which are also used for the rail runner elements primarily responsible for the guiding precision. This can possibly facilitate the construction of the guide rail or guide rails, respectively.

In the embodiment according to the present invention, vibration damping is primarily achieved in transverse planes orthogonal to the moving direction. On the other hand, it is not excluded that there is also vibration damping in moving direction. Vibration damping in moving direction is achieved in the usual manner by frictional engagement with the rail system. In many cases, however, vibration damping in moving direction is not necessary. In such cases, any frictional engagement with the rail system can be renounced without affecting vibration damping in transverse planes orthogonal with respect to the moving direction. This entails considerable advantages as the precision of object positioning in moving direction can be improved.

In view of the efforts made so far by professional circles to solve the problem of vibraton damping, which efforts were exclusively based upon the principle of frictional engagement with the rail system, it is most surprising that also by the employment of different rolling rail runner elements highly efficient vibration damping can be achieved, especially vibration damping in planes orthogonal with respect to the moving direction. By suitable shaping of the rail runner elements primarily responsible for the damping effect, it is moreover even possible to achieve also vibration damping in moving direction, if desired.

In the embodiment of the present invention, it is of special importance that the rail runner elements primarily responsible for the guiding precision can be designed in regard of damping functions without any compromises such that an utmostly precise positioning of the object in a transverse plane orthogonal to the moving direction is achieved. On the other hand, regardless of a precise guiding function, the rail runner element primarily intended for the damping effect can be designed such that an optimal damping effect is achieved.

A favourable damping behaviour can especially be noticed if by a defined exciting signal a transverse vibration is generated and if vibrational amplitude attenuation is measured especially on the object. The higher the vibrational amplitude attenuation, the better the damping behaviour.

The suitedness of rail runner elements for the damping function in combination with other rail runner elements employed for the achievement of guiding precision can be ascertained from case to case acording to this method by relatively simple preliminary tests. In general, one can say that best damping results are achieved if transverse load transmitting connection means between the object and the rail system, when viewed in a transverse plane orthogonal with respect to the moving direction in a range of a damping rail runner element, are more easily deformable than transverse load transmitting connection means between the object and the rail system in a plane orthogonal with respect to the moving direction in the range of a guiding rail runner element or/and if transverse load transmitting connection means between the object and the rail system, when viewed in a transverse plane orthogonal with respect to the moving direction in the range of a damping rail runner element, exhibit after transverse vibration excitation by a defined exciting signal a faster vibrational amplitude attenuation than transverse load transmitting connection means between the object and the rail system in a transverse plane orthogonal with respect to the moving direction in the range of a guiding rail runner element.

The term transverse load transmitting connection means includes all components which are interposed in load transmitting or vibration transmitting manner between the object and the rail system, i.e. especially the main body of the respective damping rail runner element, the arrangement of the guiding rolling members on this main body and the fastening means which serve for the connection between main body and object.

Under certain circumstances, a damping effect can also be achieved if transverse load transmitting connection means between the object and the rail system, when viewed in a transverse plane orthogonal with respect to the moving direction in the range of a damping rail runner element, have another characteristic frequency than transverse load transmitting connection means between the object and the rail system in a transverse plane orthogonal with respect to the moving direction in the range of a guiding rail runner element.

The suggestion of the present invention is especially applicable if at least one guiding rail runner element and at least one damping rail runner element each are separately located between the object and the rail system and are connected with the object. Principally, it is however also possible that at least one guiding rail runner element is directly connected with the object and at least one damping rail runner element is connected with at least one guiding rail runner element each; in the latter case, the damping rail runner element need not be connected directly with the object; it may rather be connected with the main body exclusively through an adjacent guiding rail runner element.

Preferably all roller paths of the rail system are set with rolling members of at least one guiding rail runner element as well as with rolling members of at least one damping rail runner element.

It is possible that the difference between a guiding rail runner element and a damping rail runner element is at least partly owing to the type of connection between the respective rail runner element and the object. It is particularly possible that between a damping rail runner element and the object at least one transverse vibration damping intermediate layer is provided and that in the connection between the guiding rail runner element and the object such an intermediate layer is either missing or—if present—exhibits different elasticity or/and damping characteristics.

The geometrical arrangement of the intermediate layer or intermediate layers, respectively, can be selected in response to the directions in which disturbing vibrations are to be expected. If a universal damping effect is desired, i.e. a damping effect in all directions within a transverse plane orthogonal with respect to the moving direction, it is recommendable to provide at least two damping layers whose planes are substantially parallel with respect to the moving direction, the planes of the individual damping layers defining with respect to each other an angle of other than 180°, particularly an angle of approximately 90°, this angle again being seen in a plane orthogonal with respect to the moving direction.

The damping layers may be positioned freely between the adjacent stiff surfaces. But it is also possible to dimension and arrange the damping layers such that spacer means are in engagement between the adjacent stiff surfaces if predetermined vibrational amplitudes are exceeded.

The vibration damping intermediate layer between a damping rail runner element and the object may be a coherence-promoting layer, e.g. an adhesive layer or a vulcanizing layer on the basis of rubber-like material. The damping characteristics may also be influenced by the selection of the layer material and the dimensioning thereof. Such a coherence-promoting damping layer is especially able to damp longitudinal vibrations in moving direction.

Furthermore, it is possible that the damping intermediate layer is a compressional force transmitting intermediate layer which is kept compressed between adjacent stiff surfaces.

Even if the damping intermediate layer is compressed by compressional force until possible stiff stops become effective, the damping layer having a corresponding area can quite well cause a damping effect. The materials of a damping intermediate layer may especially be elastomeric materials including the caoutchouc-elastic materials as well as plastics or plastic material. Furthermore, the intermediate layer may be a liquid, particularly a high-viscosity oil. In the latter case, an intermediate layer of defined thickness can especially be adjusted if the liquid intermediate layer is limited in its area by layer edge limiting means.

The layer edge limiting means may be sealing means, particularly annular sealing means. The latter may be elastic or plastic and elastic sealing means. If very high pressures in the liquid separating layer are to be expected, it is recommended to position the damping rail runner elements in their sealing position, i.e. to support them by stiff supporting means against the liquid pressure.

The damping effect of a damping rail runner element including a damping layer can be rendered especially good if a solid body damping and a liquid damping are combined with each other, e.g. such that the damping intermediate layer comprises liquid chambers whose volumes are variable in opposite sense by vibrations in a plane orthogonal with respect to the moving direction and if these liquid chambers are connected with each other by at least one damping channel. It is then possible that the liquid chambers are formed by recesses of the damping layer adjacent to contact faces of a damping rail runner element and of an object.

The damping characteristics of a damping rail runner element can also be based upon the feature that a damping rail runner element is frictionally connected with the object in at least one plane orthogonal with respect to the moving direction. Then it is possible that the damping rail runner element is clamped in moving direction between two clamping elements which are attached to the object.

Furthermore, it is possible that the difference between the damping rail runner element and the guiding rail runner element is at least partly owing to the different materials of a main body of the damping rail runner element and of a main body of the guiding rail runner element. It is particularly possible that the material of the main body of the damping rail runner element and the material of the main body of the guiding rail runner element differ from each other by different moduli of elasticity, the modulus of elasticity of the guiding rail runner element being bigger. For example, it is possible that the material of the main body of the guiding rail runner element is steel and the material of the main body of the damping rail runner element is selected from the group of light metals and hard-elastic plastics.

Further, there is included the possibility that the difference between a guiding rail runner element and a damping rail runner element is at least partly owing to the difference between the cross-sectional shape or/and the cross-sectional dimension of a main body of the guiding rail runner element and a main body of the damping rail runner element, this cross-sectional shape being viewed in a plane orthogonal with respect to the moving direction.

Further, there is included the possibility that a main body of the damping rail runner element is provided with at least one rigidity-reducing slit extending approximately along the moving direction and that in the main body of a guiding rail runner element a corresponding slit is either not provided or—if provided—dimensioned differently or/and filled or/and filled differently. The at least one rigidity-reducing slit of the main body of a damping rail runner element may contain a filler which takes an influence on the elasticity or/and the damping characteristics of the main body. An optimal damping function is achieved with the aid of the slit if the at least one slit of the main body of the damping rail runner element extends along the entire length of this main body in moving direction. However, the possibility of a slit closed in moving direction on at least one end should not be excluded, especially if the slit is very long in moving direction.

Further, there is included the possibility that the difference between a guiding rail runner element and a damping rail runner element is at least partly owing to a difference in supporting qualities of a main body of the guiding rail runner element on the one hand and of a main body of the damping rail runner element on the other hand for respective rows of transverse load transmitting rolling members.

It is possible that the difference in supporting quality is at least partly owing to the fact that in case of a guiding rail runner element the row of transverse load transmitting rolling members travels on a track directly formed to the main body, while in case of a damping rail runner element the row of transverse load transmitting rolling members travels on a subcarrier which is supported on the main body. However, there should not be excluded the possibility that subcarriers are provided both on the guiding rail runner element as well as on the damping rail runner element, which subcarriers are differently supported on the respective rail runner element.

An especially interesting combination is like follows: The guiding rail runner element is made from a harder material on which the rolling members can be guided directly; on the other hand, the damping rail runner element is made from a material which is more easily deformable and which is less suited for the direct guidance of the rolling members, e.g. light metal. So, subcarriers of harder material are employed for the more easily deformable main body of the damping rail runner element. On account of their increased hardness, such subcarriers are responsible for low-wear guidance of the rolling members on the one hand; on the other hand, by engagement of these subcarriers with the main body, an additional damping effect is achieved so that the damping function is on the one hand owing to the material structure of the main body and on the other hand to the mating of the subcarrier and the main body.

The combination of a subcarrier and a main body is especially interesting for the damping effect as a frictional micro movement may be allowed in the abutment face between a subcarrier and a main body. This frictional micro movement occurs primarily in a transverse plane orthogonal with respect to the moving direction. However, in case of corresponding support, micro friction in moving direction is not excluded, either, so that there is also achieved a certain degree of damping in moving direction while no frictional contact between the rail runner element and the rail system is required.

If a subcarrier is employed between rolling members and main body of the damping rail runner element, it is further possible to support the subcarrier on the respective main body through at least one transverse vibration damping separating layer. Again a distance limitation in the form of spacer means may be provided parallel to the separating layer between the main body and then subcarrier, which spacer means are stiffer than the separating layer. This is e.g. accomplished in such a manner that the separating layer is received by a pocket of a contact face of the subcarrier or of the main body. The separating layer between the subcarier and the main body may consist of rubber-elastic or plastic material. If the separating layer consists of a material of stable shape or of form-elastic material, it is possible that the pocket is open at its end portions spaced from one another in moving direction. However, it is also possible that the pocket is closed along a peripheral edge of the separating layer; in such cases, the separating layer may also be formed by a liquid, especially a viscous liquid. The separating layer may principally be the only force transmitting means between the subcarrier and the main body. However, a damping effect is also achieved if the separating layer is possibly compressionally prestressed by special tension means such that respective spacer means of the subcarrier and of the main body are in mutual engagement.

Further, it is possible that the difference between a guiding rail runner element and a damping rail runner element is at least partly owing to the fact that in a cross-section orthogonal with respect to the moving direction the rolling members of the guiding rail runner element and the rolling members of the damping rail runner element define different engagement geometries with associated tracks of the respective rail runner element. The term "engagement geometry" is to be understood in a very general sense. The engagement geometry depends on the one hand—when viewed in a cross-section orthogonal to the moving direction—upon the profile of the rolling member and on the other hand upon the profile of the track. The profile of the rolling member can be varied by the use of balls of different size or of rollers of different size and/or of different surface line shape. Further, the profile of the respective tracks can be varied; so, there exists the possibility of adjusting the respectively desired damping effect. It is however quite conceivable that the damping behaviour in a transverse plane orthogonal with respect to the moving direction can considerably be influenced only by variation of the "osculation" between balls and track profile.

Further, there is taken into consideration the possibility that the difference between a guiding rail runner element and a damping rail runner element is partly owing to the fact that the rolling members of the guiding rail runner element and the rolling members of the damping rail runner element differ from each other at least in regard of one of the following criteria: geometry, material selection, hardness.

Further, there is also taken into consideration the possibility that the difference between a guiding rail runner element and a damping rail runner element is at least partly owing to the fact that the rolling members of the guiding rail runner element are clamped between an associated roller path of the rail system and an associated track of the guiding rail runner element under greater prestress than the rolling members of the damping rail runner element between the associated roller path of the rail system and an associated track of the damping rail runner element.

Further, there is taken into consideration the possibility that the difference between a guiding rail runner element and a damping rail runner element is at least partly owing to the fact that the rows of transverse load transmitting rolling members of the guiding rail runner element are in engagement with a track of the guiding rail runner element, which track exhibits a higher surface hardness than the corresponding track of a damping rail runner element.

The difference between a guiding rail runner element and a damping rail runner element may also be owing to the fact that in case of a damping rail runner element a common prismatic subcarrier is provided which has respective rolling member tracks for load transmitting rolling member rows of mutually adjacent rolling member loops and prismatic side faces for being supported on respective supporting faces of a main body, said rolling member tracks and said prismatic side faces being shaped such that, when viewed in a plane orthogonal with respect to the moving direction, the resulting force transmission direction of a rolling member track defines together with a prismatic side face allocated to a rolling member track in terms of force transmission to the main body an angle $\delta$, said angle $\delta$ being larger than 90°, preferably larger than 120° and most preferably larger than 150°, and that in case of a guiding rail runner element the load transmitting rolling member rows of mutually adjacent rolling member loops are in engagement with tracks directly shaped on a respective main body or in engagement with tracks of a common prismatic subcarrier, said rolling member tracks and said prismatic side faces being located and shaped with respect to each other on the prismatic subcarrier such that, when viewed in a sectional plane orthogonal with respect to the moving direction, a resulting force transmission direction through one of the rolling member tracks defines an angle of approximately 90° with a prismatic side face which is allocated to the rolling member track in terms of force transmission to the main body.

All the afore-mentioned possibilities of varying a connection between the object and the rail system (in the above-defined general sense) can be combined with each other in order to achieve by simple preliminary tests various damping behaviours.

A specific advantage of the present invention is to be seen in the following features: There are available runner elements which have different deforming characteristics in view of different guiding tasks; these runner elements are suited for assembly with one and the same guide rail. One may use guiding runner elements which are determined and suited for the guidance of heavier objects while offering utmost guiding precision; and one may use damping runner elements wich are determined and suited for the guidance of lighter objects. The selection of the latter runner elements can again be accomplished by most simple preliminary tests. So, there is the possibility of achieving high-precision vibration-damped guidance by the combination of existing standard elements.

A preferrred embodiment of the rail runner elements—and this applies both to guiding as well as to damping rail runner elements—is seen in the feature that a rail runner element has a substantially U-shaped cross-section and is with one web and two legs located opposite to respective profile side faces of a profiled rail of the rail system. It is possible then to guide the object on one or a plurality of rails by guiding and damping rail runner elements arranged in series.

In general, one will select an arrangement wherein the guiding and the damping rail runner elements are approximately symmetrically distributed within the series arrangement with respect to a longitudinal midpoint of the series arrangement. This means that it is possible that the series arrangement comprises a middle damping rail runner element and two terminal guiding rail runner elements or that the series arrangement comprises a middle guiding rail runner element and two terminal damping rail runner elements.

If heavier objects are guided which are subject to high transverse forces and moments transverse to the rail running direction, it is of advantage to guide the object on several preferably substantially parallel rails by guiding an damping rail runner elements.

Further, the present invention is to protect all novel rail runner elements described hereinbefore and hereinafter as to their damping characteristics. This applies especially to damping rail runner elements whose damping characteristics are influenced at least by one of the following measures:

The damping rail runner element comprises a) at least one possibly profiled damping layer as connecting layer between a main body of the rail runner element and an object to be attached;

b) a main body having at least one slit weakening the cross-section of the main body;

c) at least one damping separating layer between a main body and a subcarrier supporting the row of transverse load transmitting rolling members;

d) a subcarrier for at least one row of rolling members, which subcarrier is supported on an associated main body such that the subcarrier is capable of micro friction with respect to the main body when viewed in a plane orthogonal to the moving direction.

In dependence upon the respective kind of use, the suggested damping rail runner elements may also be used as guiding rail runner elements; this means that they need not necessarily be used in combination with guiding rail runner elements. This applies especially if precise guidance is less important than reliable damping. For example, in case of machine tools also protective covers can be guided on rails by means of rolling elements. In such cases, an absolute straight line guiding precision is not so important. It is therefore possible to make in such cases exclusively use of one of the damping rail runner elements described hereinbefore.

The invention will be described in greater detail below by reference to the forms of embodiment as represented in the drawings, wherein:

FIG. 1 shows a plan view of a guidance of an object on a two-rail system;

FIGS. 13–15 show again sections corresponding to that one of FIG. 3 in further damping rail runner elements;

FIGS. 16a and 16b show sections corresponding to FIGS. 2 and 3, respectively, through a guiding and through a damping rail runner element;

FIG. 17 shows an enlarged part-section of FIG. 16b;

FIGS. 20 and 21 show a further combination of a guiding rail runner element and a damping rail runner element; and FIG. 22 shows an enlarged detail of FIG. 21.

Figure 2:
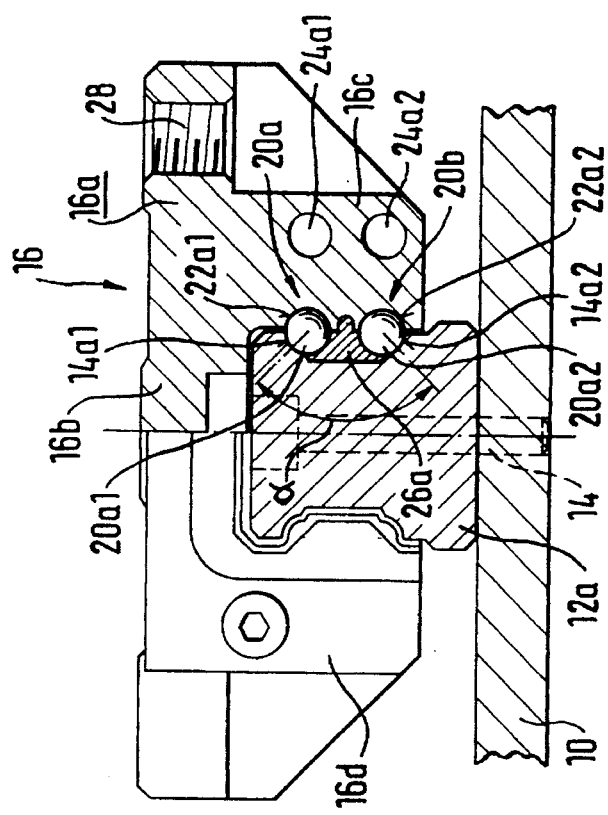
FIG. 2 shows a section along line II—II in FIG. 1.

In FIGS. 1–3, 10 denotes a pedestal on which two guide rails parallel to each other are laid which form together a rail system 12. The individual rails are designated by 12a and 12b. The rails 12a and 12b are fastened to the pedestal by fastening screws 14. One of these fastening screws is shown in FIG. 2.

On each of the two rails 12a and 12b, two guiding rail runner elements 16 and therebeween a damping rail runner element 18 are guided. The arrangement may also be such that two damping rail runner elements 18 are arranged on either side of a guiding rail runner element 16.

FIG. 2 shows one of the guiding rail runner elemens 16. It comprises a U-shaped main body 16a having a web portion 16b and two leg portions 16c and 16d. On each of the leg portions 16c and 16d, two rolling member loops, namely ball loops 20a and 20b, are arranged with a supporting ball row 20a1 and 20a2, respectively, each to travel along roller paths 14a1 and 14a2, resp., of the guide rail 12a. On the other hand, the supporting ball rows 20a1 and 20a2 are supported on tracks 22a1 and 22a2 of the respective legs 16c and 16d, resp. The ball loops are closed by returning ball rows which are guided through bores 24a1 and 24a2. The supporting ball rows 20a1 and 20a2 are held by retaining strips 26a to be in engagement with the ball tracks 22a1 and 22a2 so that the balls of the ball loops are undetachable components of the guiding rail runner element 16 even if the guiding rail runner element is drawn off from the associated guide rail 12a. The force transmitting planes of the supporting ball rows 20a1 and 20a2 define in the sectional plane according to FIG. 2 an angle α of approximately 90°.

The main body 16a has fastening bores 28. These fastening bores 28 serve for the screwing of the main body 16a to a table plate 30 shown in FIG. 1 by a dot-dash line. This table plate is also called "object".

Figure 3:
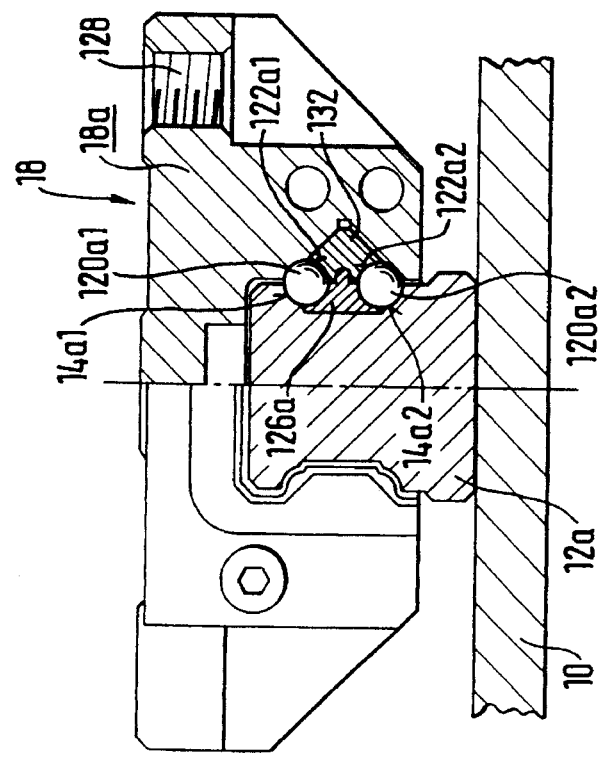
FIG. 3 shows a section along line III—III in FIG. 1.

The damping rail runner element 18 shown in FIG. 3 is principally equivalent in construction to the guiding rail runner element 16 of FIG. 2, except for the following difference: While according to FIG. 2 in case of the guiding rail runner element 16 the supporting ball rows 20a1 and 20a2 travel in tracks 22a1 and 22a2 which are directly formed to the main body 16a possibly made from hardened antifriction bearing steel, in case of the damping rail runner element 18 of FIG. 3 the supporting ball rows 120a1 and 120a2 are guided substantially on a prismatic subcarrier 132 which has ball tracks 122a1 and 122a2. The retaining strip 126a is held by the subcarrier 132. The supporting ball rows 120a1 and 120a2 travel again in the ball tracks 14a1 and 14a2 of the guide rail 12a. The main body 18a of the damping rail runner element 18 is made from aluminum. The subcarrier 132 is made from steel. Hence, the main body 18a is more easily deformable than the main body 16a even if both main bodies have equal cross-sections. As a consequence thereof, the rail runner element 18 does not substantially contribute to a precise guidance of the object 30 on the rail system 12, but can cause a vibration damping. This vibration damping effect is still promoted by the fact that micro friction can take place between the steel subcarrier 132 and the main body 18a. The vibration damping function of the damping rail runner element 18 becomes especially effective in the transverse plane orthogonal with respect to the moving direction, as shown in FIG. 3. However, it is not excluded that there is a certain vibration damping effect also with respect to vibrations parallel to the moving direction, e.g. if micro friction between the subcarrier 132 and the main body 18a is possible also parallel to the moving direction.

The damping characteristics of the damping rail runner element 18a can still be improved by the feature that this damping rail runner element has a weaker cross-section than the rail runner element 16. Further, the damping characteristics can be influenced by an amendment of the osculation of the balls of the supporting ball rows 120a1 and 120a2 with the ball tracks 122a1 and 122a2. Further, it is possible to influence the damping characteristics by the selection of different materials for the subcarriers 132 and especially also by different surface hardenings of the subcarriers in the area of the ball tracks 122a1 and 122a2. Further, the damping behaviour can be influenced by different materials, especially materials of different hardness, selected for the balls of the ball loops. The main bodies 16a and 16b can be fastened to the object 30 principally in the same way. However, it is also possible to influence the damping characteristics of the damping rail runner element 18 by different fastening means.

In case of the guiding rail runner element 16, the main body 16a, the screws (not shown) cooperating with the tapholes 28, and the supporting ball rows 20a1 and 20a2 represent the transverse load transmitting connection means between the object 30 and the guide rail 12a.

In case of the damping rail runner element 18 according to FIG. 3, the main body 18a, the fastening screws engaging the bores 128, the subcarrier 132, and the supporting ball rows 120a1 and 120a2 represent the transverse load transmitting connection means between the object 30 and the rail 12a. If the transverse load transmitting connection means for the guiding rail runner element 16 according to FIG. 2 on the one hand are compared with the transverse load transmitting connection means for the damping rail runner element 18 of FIG. 3 on the other hand, one can principally say that these transverse load transmitting connection means for the case of the damping rail runner elements 18 are more easily deformable and exhibit upon transverse vibration excitation by a defined exciting signal a faster vibrational amplitude attenuation than the transverse load transmitting connection means for the guiding rail runner elements 16. Frequently, it is possible that the supporting ball rows are prestressed between the roller paths of the rail and the tracks of the rail runner element. Also this prestress can be utilized as a damping behaviour adjusting parameter.

Figure 4:
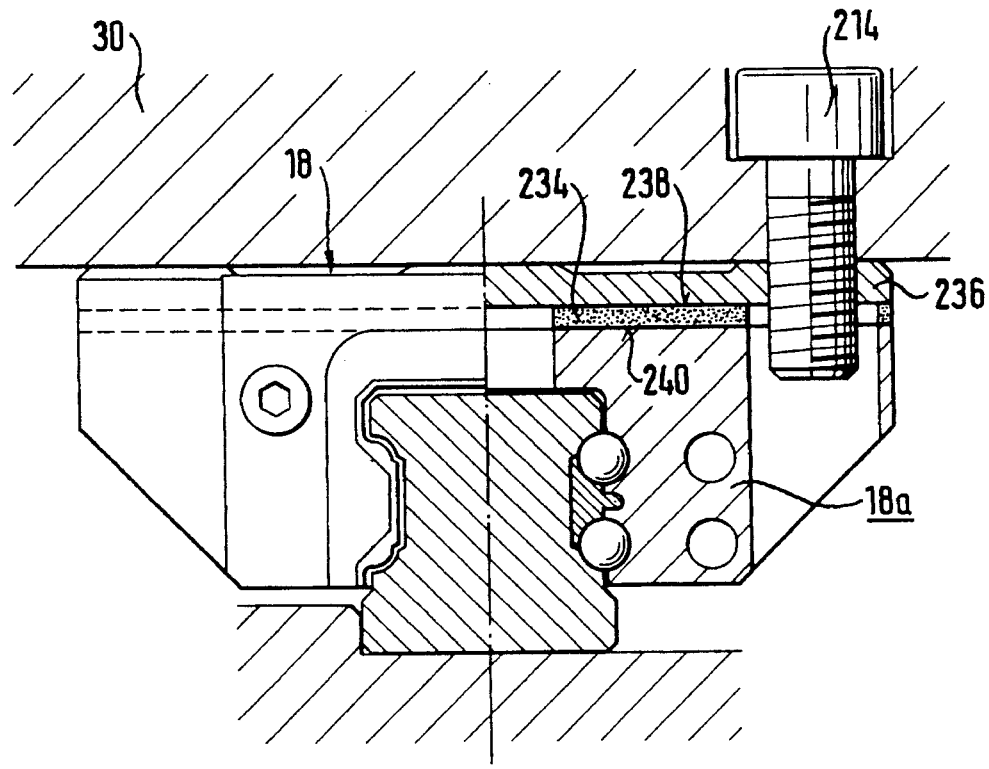
FIGS. 4–8 show sections corresponding to that one of FIG. 3 in further embodiments of damping rail runner elements.

A vast field of influencing the damping characteristics exists in the way of connecting the damping rail runner element 18 with the object 30. This is shown in the following Figures:

According to FIG. 4, the main body 18a is fastened by a damping intermediate layer 234 to a carrier plate 236 which is fixed to the object 30 by means of screws 214. This damping intermediate layer 234 allows to the main body 18a damped vibrations in all directions vertical with respect to the moving direction, this means in all possible directions within the sectional plane of FIG. 4. The intermediate layer 234 may be a coherence-promoting layer, e.g. an adhesive layer or a vulcanized rubber layer which may be connected with the adjacent surface 238 of the carrier plate 236 and the adjacent surface 240 of the main body 18a by vulcanization of rubber-like material.

Figure 5:
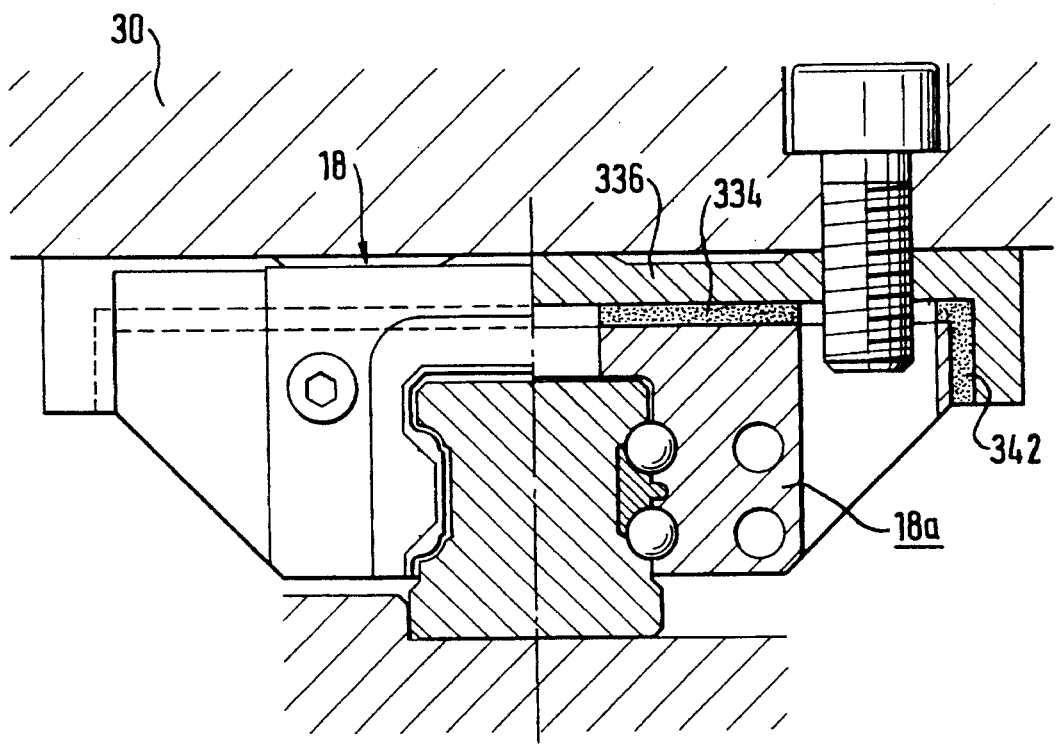

The embodiment of FIG. 5 differs from that one of FIG. 4 by the feature that the carrier plate 336 is formed as a profile part. Thus, in addition to the damping intermediate layer 334 a further damping intermediate layer 342 can be provided between the main body 18a and the object 30. These two damping intermediate layers 334 and 342 extend both parallel with respect to the moving direction and define with each other an approximately right angle. Thus, the damping effects of vibrations directed horizontally and vertically when related to FIG. 5 can be optimized. Also in FIG. 5, the intermediate layers 334 and 342 are coherence-promoting layers.

Figure 6:
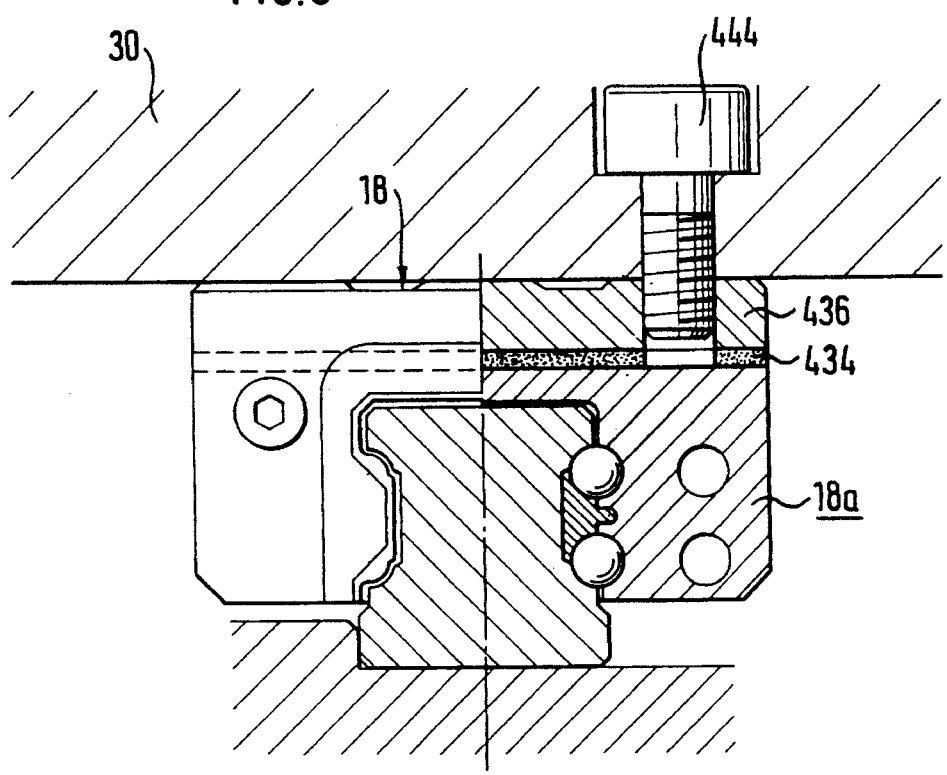

In FIG. 6, a damping intermediate layer 434 is provided between the main body 18a and the carrier plate 436. The main body 18a is connected with the carrier plate 436 by a coherence-promoting intermediate layer 434. Here, the damping behaviour can be influenced by the prestress of the damping intermediate layer.

Figure 7:
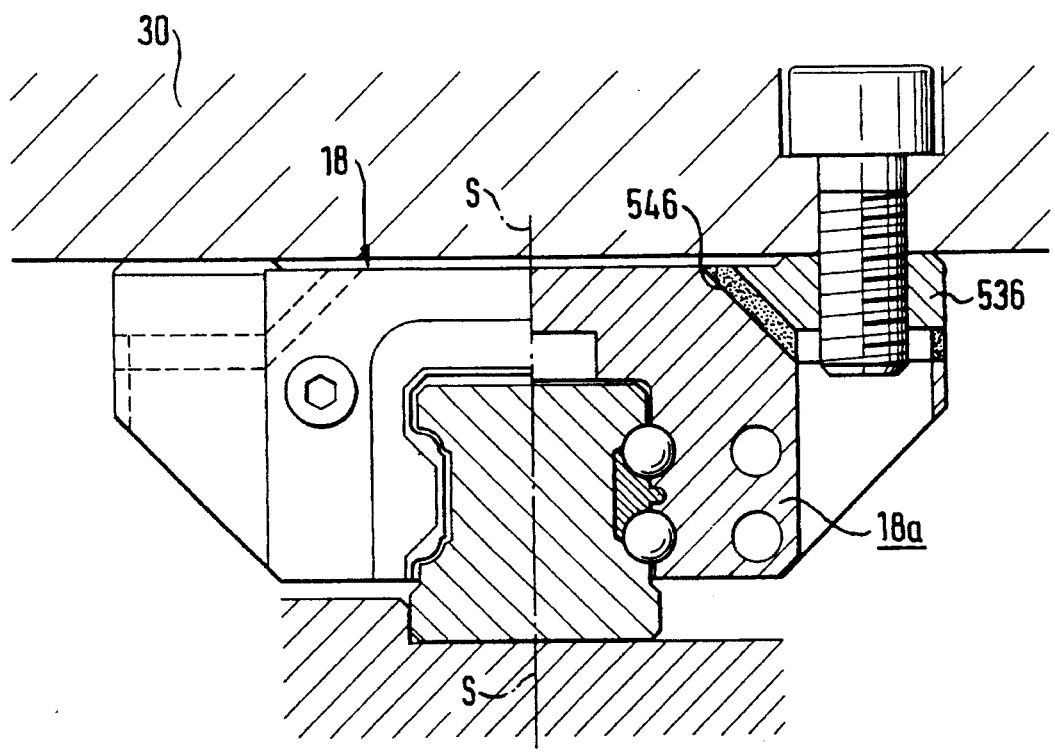

In the embodiment of FIG. 7, a damping intermediate layer 546 is provided between the main body 18a and the carrier plate 536. The carrier plate 536 is screwed to the object 30. The damping intermediate layer 546 is in a partly inclined position. A corresponding damping intermediate layer is provided between the main body 18a and the carrier plate 536 on the left-hand side of the plane of symmetry (not shown). The damping intermediate layer is again a coherence-promoting layer. By the inclination of the damping intermediate layers 546, the damping behaviour can be influenced.

Figure 8:
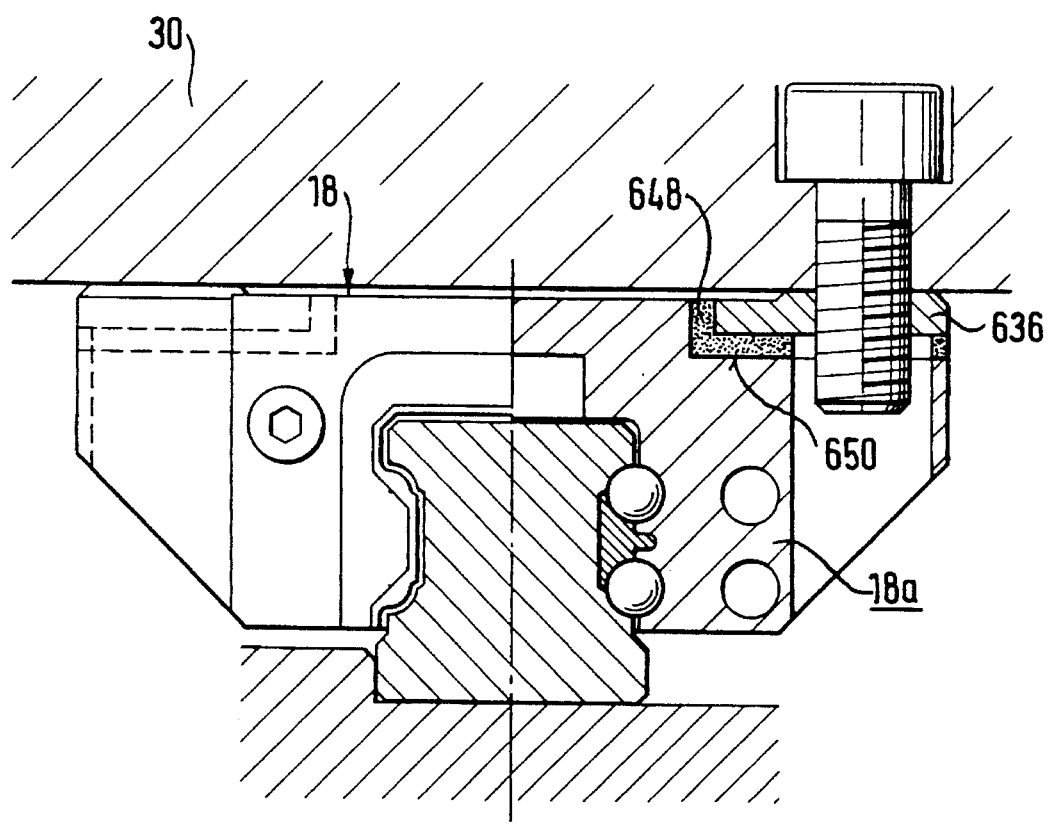

In the embodiment of FIG. 8, the object 30 is coherently connected with the main body 18a by an angular damping intermediate layer 648, this profiled intermediate layer 648 being cohesively arranged between a profile recess 650 and a complementary profile of a carrier plate 636. The intermediate layer 648 is also provided on the left-hand side of the plane of symmetry (not shown).

Figure 9:
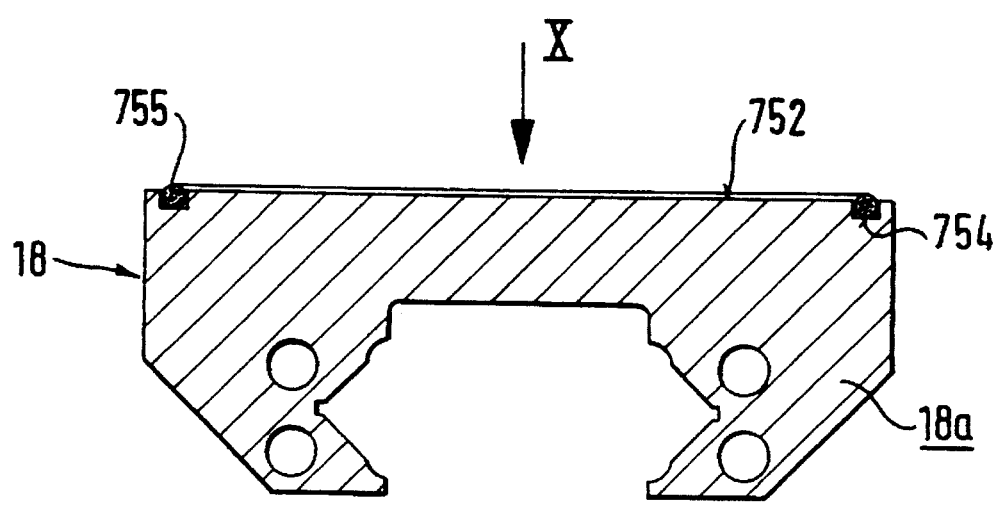
FIG. 9 shows again a section corresponding to that one of FIG. 3 through a damping rail runner element.
Figure 10:
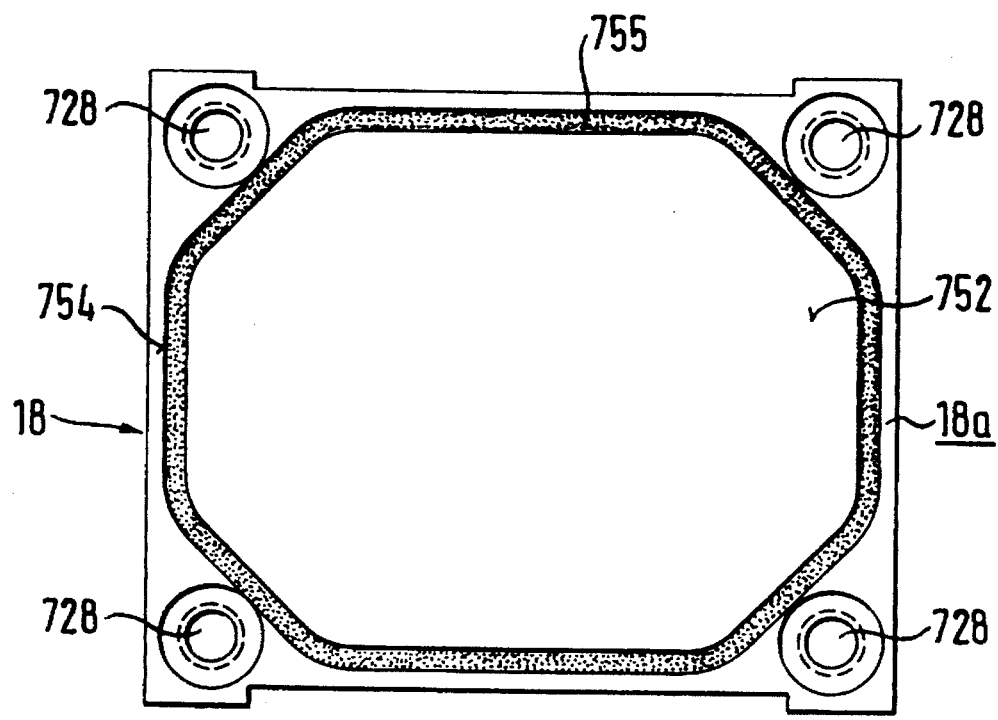
FIG. 10 shows a plan view of FIG. 9 in the direction of the arrow X in FIG. 9.

In the embodiment according to FIGS. 9 and 10, the main body 18a of a damping rail runner element 18 has a contact surface 752 for contact with the object 30. The contact surface 752 is plane but has an annular groove 754 receiving a sealing ring 755 of elastomeric material. The main body 18a is screwed to the object 30 by screws which engage bores 728. Inside the sealing means 755, i.e. inside the annular groove 754, a layer of viscous damping agent is received.

Figure 11:
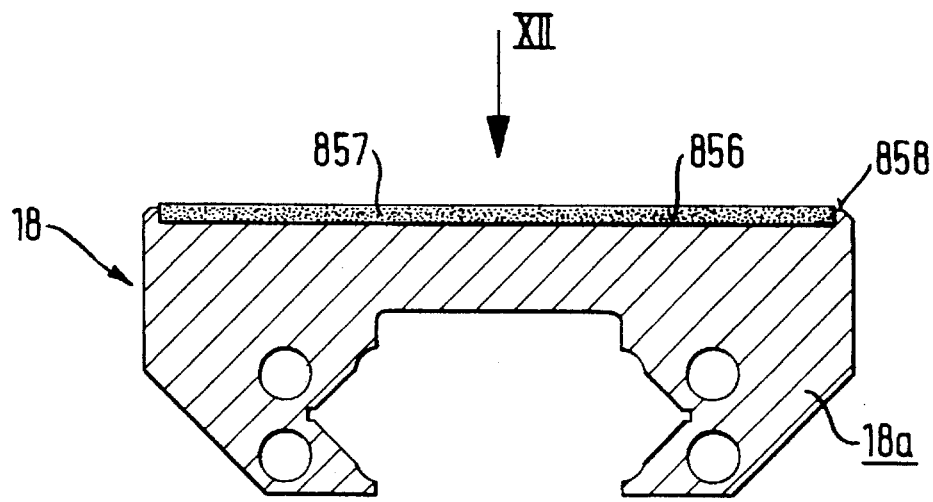
FIG. 11 shows a section corresponding to that one of FIG. 9 in a further embodiment of a damping rail runner element.
Figure 12:
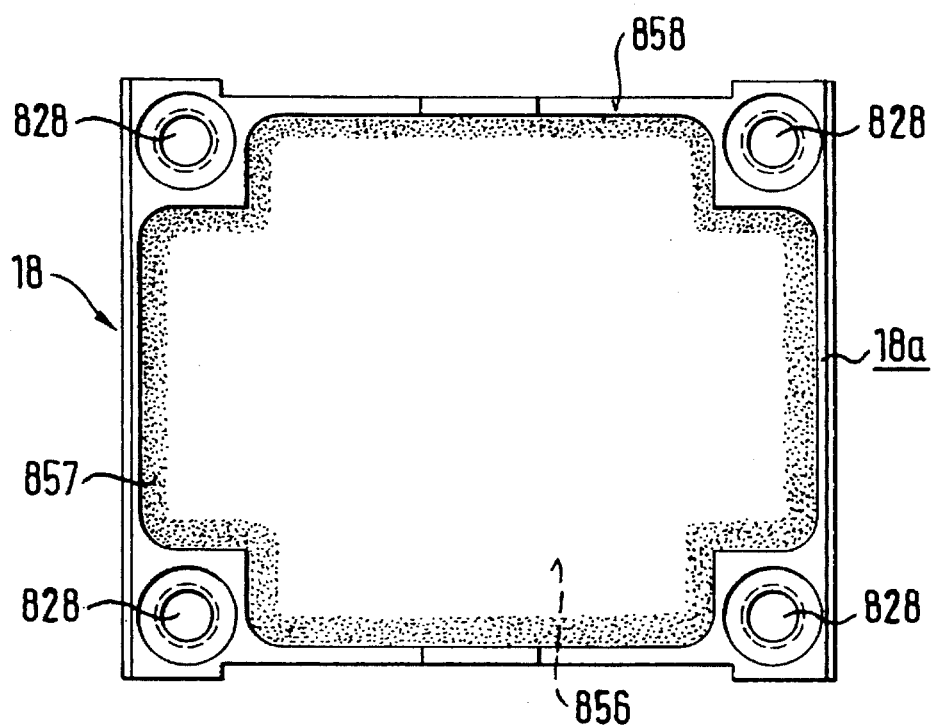

In the embodiment according to FIGS. 11 and 12, a flat trough 856 is formed on the upper side of the main body 18a.

This trough receives a damping intermediate layer 857 consisting e.g. of an elastomeric plastic material. This elastomeric intermediate layer when being in the unloaded state projects slightly upwardly over the marginal face 858 and is compressed by screws engaging the bores 828 when the main body 18a is biased towards the object, possibly compressed until the marginal face 858 abuts against the plane lower side of the object.

In the embodiments according to FIGS. 9 to 12, the screws engaging the bores 728, 828 may be left out in order to achieve entrainment of the main body 18a and of the object through adhesive force.

Figure 13:
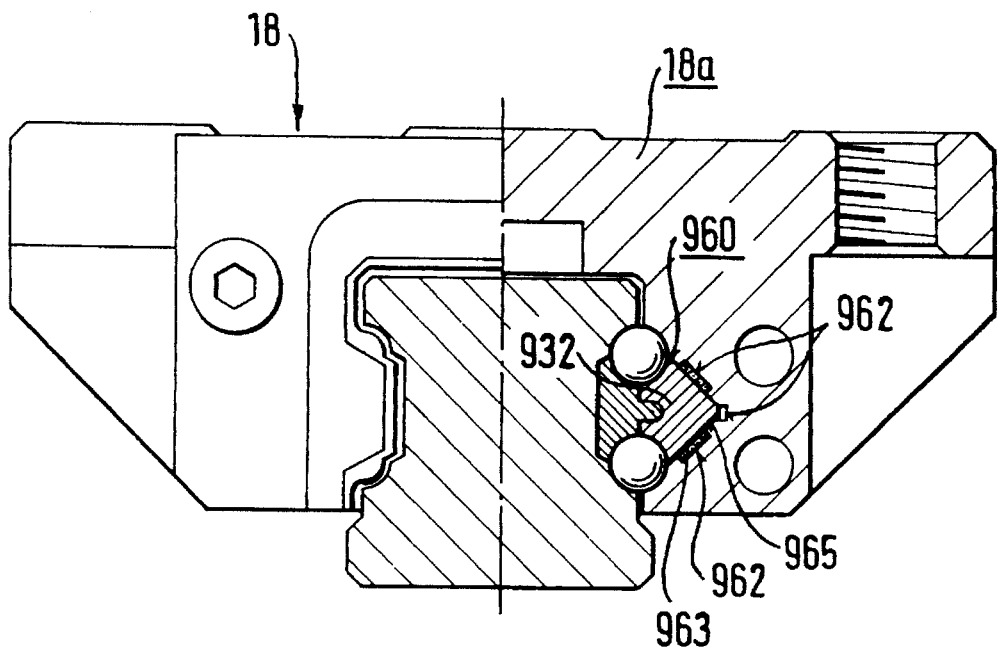
Figure 14:
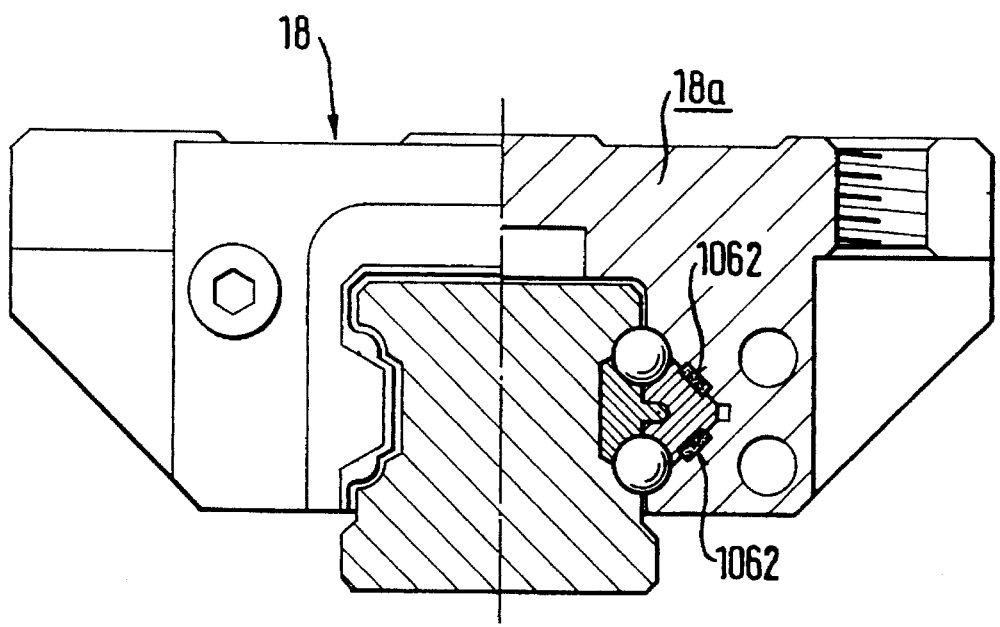

FIG. 13 is a sectional view corresponding to that one of FIG. 3. In modification of the embodiment according to FIG. 3, the subcarriers 932 are received by complementary profile channels 960; in the contact faces of these profile channels, pockets 962 are formed for receiving a damping intermediate layer 963. The pockets 962 may be closed at their ends. In this case, the corresponding damping layers may consist of a liquid or elastomeric material. In case of elastomeric fillers, the filling of the pockets may be dimensioned such that the filler when being in the unmounted state projects slightly over the contact faces 965 and is compressed when the rail runner element and the rail are assembled. However, it is also possible that—as shown in FIG. 14—the pockets 1062 are open on both ends or on one end.

Figure 15:
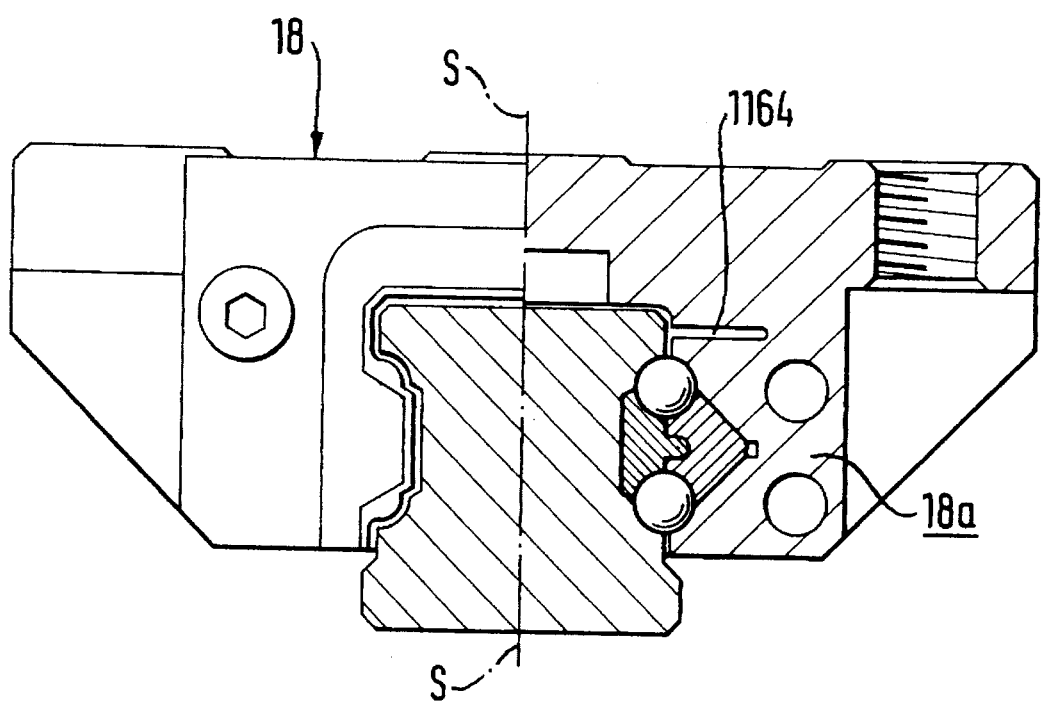
FIG. 15 shows a plan view in the direction of the arrow XII in FIG. 11.

FIG. 15 shows a modification of the embodiment of FIG. 3; a slit 1164 is cut into the main body 18a. By such a slit, the deformability of the main body 18a can be influenced in terms of an increased damping effect. Instead of one slit, a plurality of slits may be provided in different directions with different slit depths and different slit widths. The slit arrangement is preferably symmetrical on both sides of the plane of symmetry S—S. The slits may be filled with damping layers. It is possible to select for the guiding rail runner elements the same embodiment as that one shown in FIG. 15 and to achieve different guiding and damping characteristics by different filling of the slits.

In FIGS. 16a and 16b, semi-sectional views are shown. The semi-sectional view according to FIG. 16a shows a guiding rail runner element 16 which is guided along a guide rail 12 by means of two rolling member loops 1220a and 1220b. The supporting roller rows 1220a1 and 1220a2 engage on the one hand the roller paths 1214a1 and 1214a2 of the guide rail 12a.

On the other hand, the rollers engage directly tracks 12226a1 and 12226a2 of the main body 16a. The main body is again preferably made from antifriction bearing steel. In a corresponding damping rail runner element 18 according to FIG. 16b, the rollers of the supporting roller rows 1320a1 and 1320a2 are guided on tracks of subcarriers 1332 which are supported by supporting faces 1366 of the main body 18a. The supporting faces 1366 are show in FIG. 17 in an enlarged scale. There are shown concave channels which may be cylindrical or concave in both a cross-sectional view and a longitudinal section. The subcarriers 1332 have convex supporting faces 1368 which may again be cylindrical or convex along two orthogonally crossing directions in response to the shape of the channels 1366. The curvature ratios of the convex and concave supporting faces 1368 and 1366 influence the micro friction between the subcarrier 1332 and the main body 18a. Consequently, an adjustment of the engagement geometry of the supporting faces 1366 and 1368 can influence the damping behaviour. Also the surface line configuration and the hardness of the rollers can be utilized for influencing the damping characteristics.

Figure 18:
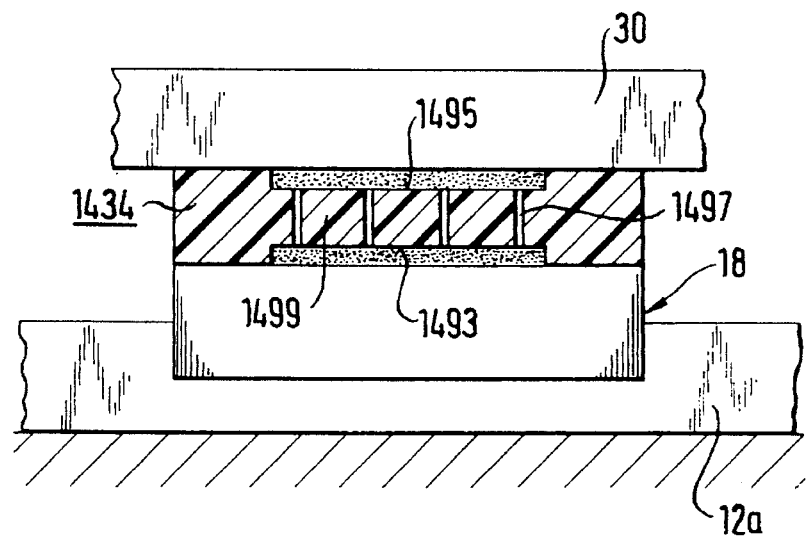
FIG. 18 shows a further embodiment including a damping intermediate layer.

In FIG. 18, a damping layer 1434 is formed between a damping rail runner element 18 traveling along a rail 12a and the table plate or the object. This damping layer 1434 is designed in its midportion 1499 as a liquid-permeable "diaphragm". The chambers 1495 and 1493 above or below, respectively, the diaphragm 1499 are connected with each other by damping bores 1497 and are filled with a liquid, e.g. a hydraulic oil. The damping layer 1434 can be made from plastic or rubber-elastic material, optionally also from metal; in case of the metallic version, correspondingly small cross-sections guarantee elasticity. Vibrations in a plane orthogonal with respect to the longitudinal rail direction cause deformations of the diaphragm area 1499 and thus oppositely oriented changes of the volume of the chambers 1495 and 1493. The volume equalization is effected through the damping bores 1497. The filling degree of the chambers 1495 and 1493 can be ascertained by tests and is responsible for the damping effect just as the elastic behaviour of the intermediate layer 1434. The rail runner element 18 may have any shape, e.g. that one of FIGS. 2 or 3 or 13 or 15 or 16a and 16b.

Figure 19:
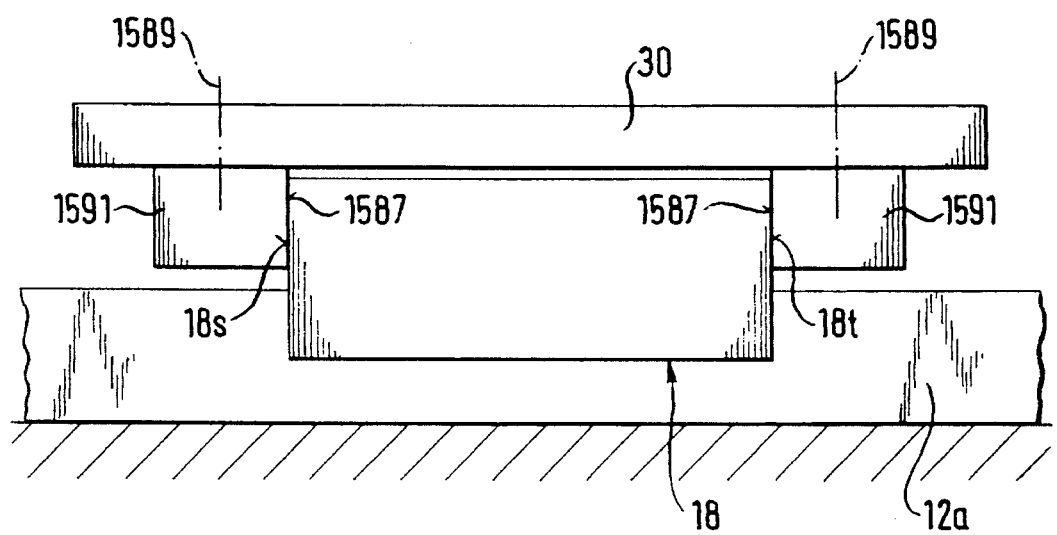
FIG. 19 shows a further embodiment including a clamping engagement of the damping rail runner element and an object.

The embodiment of FIG. 19 shows again a rail 12a having a damping runner element 18. The damping rail runner element 18 is connected with an object or a table plate 30, the damping characteristics being determined by the kind of connection between the damping rail runner element 18 and the object 30. The damping rail runner element 18 may again be principally designed as shown in FIGS. 2, 3, 13, 14, 15, 16a, 16b and 17. The connection between the rail runner element 18 and the object 30 is accomplished by clamping members 1591 being connected with the object 30 e.g. by means of screw couplings 1589 and abutting with their side faces 1587 which are orthogonal with respect to the moving direction against terminal faces 18s, 18t of the rail runner element 18 in terms of a clamping effect. The clamping degree is responsible for the damping effect. Such clamping can also be accomplished by a clamping means (not shown), e.g. by screws. The damping effect of this embodiment can also be influenced by the surface treatment of the surfaces 1587, 18s, 18t or by any intermediate layers between these surfaces. It is also possible to make the clamping members 1591 bipartite or multisectional and to provide between the individual parts clamping means such as screw spindles so as to be able to achieve the desired clamping effect without the use of externally applied tools. During operation, there may be micro friction between the surfaces 1587 on the one hand and 18s, 18t on the other hand, i.e. friction exhibiting amplitudes in the micrometer range.

FIGS. 20 to 22 show a further combination of a guiding rail runner element 16 (FIG. 2 or 20) and of a damping rail runner element 18 (FIGS. 21 and 22). FIG. 20 shows an embodiment corresponding to that one of FIG. 3. A prism on which sliding surfaces 16226a1, 16226a2 are formed for the ball rows 1620a1, 1620a2 is provided in the U-shaped main body 16a as a common subcarrier 1632 for the two loaded ball rows 1620a1, 1620a2. The side faces 1632f, 1632g of the prism define an angle α, which is somewhat smaller than or approximately 90°. The prism abuts with these side faces against corresponding contact faces of the main body 16a.

The resulting force transmission directions R which extend through the midpoints of the tracks 16226a1, 16226a2 and the opposite tracks of the rails are standing on the side faces 1632g and 1632f of the prism almost vertically and define with the horizontal center plane E an angle β of approximately 45°. It is readily possible that in case of such an arrangement there is only little micro friction between the prismatic subcarrier 1632 and the main body 16a, as there is form-locking engagement which is secured by prestress exerted upon the balls.

Definitely different is the situation in the embodiment of the associated damping rail runner element 18. One can recognize a prismatic subcarrier 1633 which is received by a complementary prismatic recess of the main body 18a. The side faces 1633f and 1633g of the prism define an angle $\alpha$ which is substantially greater than the angle $\alpha$ of FIG. 20 and which is slightly different from 180°. The angle $\beta$ of a resulting force transmission direction R with respect to the horizontal central plane E is again approximately 45°. One can now recognize, however, that the resulting force transmission direction R defines with the adjacent prism side face 1633f an acute angle $\gamma$ and a large obtuse angle $\delta$ with the prism side face 1633g associated in the sense of force transmission. One can easily imagine that in this embodiment micro friction is possible between the prismatic subcarrier 1633 and the associated side faces of the main body in a plane vertical with respect to the moving direction. The angle $\alpha$ should range between 120° and 180°, preferably between 150° and 175°. If the angle $\alpha$ approaches 180° and is optionally equal to 180°, the fastening of the prismatic subcarrier 1633 is effected only by frictional forces; this is also possible in case of a corresponding prestress between the main body 18a and the rail. The value of the angle $\delta$ should in any case be more than 90°, preferably more than 120°, optionally even more than 150°.

What is claimed is:

1. A linear guiding apparatus for guiding an object, comprising a rail system and a first partial group of object-guiding rail runner elements—hereinafter referred to as guiding rail runner elements—primarily responsible for the guiding precision of the object, which first partial group comprises at least one group member, said guiding rail runner elements being guided in a moving direction along associated roller paths of said rail system by loops of rolling members mounted on said guiding rail runner elements, a second partial group of damping elements guided along said rail system, connected with said object and being primarily responsible for the damping of vibrations directed transversely to the moving direction, and being additionally provided between said object and said rail system, which second partial group comprises at least one group member, said damping elements differing from said guiding rail runner elements with respect to the internal structure and/or with respect to the mounting relationship between said object and said rail system, and with the further features a. at least one damping element—hereinafter referred to as damping rail runner element—is also guided on roller paths of said rail system by loops of rolling members mounted on said rail runner element, which roller paths are also associated with said first partial group of guiding rail runner elements, and b. the damping characteristics of said damping rail runner element are determined by transverse load transmitting connection means provided in a transverse load transmission path between said rolling members of said damping rail runner element and said object.

2. The linear guiding apparatus of claim 1, characterized in that the difference between a guiding rail runner element and a damping rail runner element is at least partly owing to the fact that said rolling members of said guiding rail runner element and said rolling members of said damping rail runner element differ from one another at least in regard of one of the following criteria: geometry, material selection, hardness.

3. The linear guiding apparatus of claim 1, characterized in that the difference between a guiding rail runner element and a damping rail runner element is at least partly owing to the fact that the rolling members of said guiding rail runner element are clamped between an associated roller path of said rail system and an associated track of said guiding rail runner element under greater prestress than said rolling members of said damping rail runner element between the associated roller path of said rail system and an associated track of said damping rail runner element.

4. The linear guiding apparatus of claim 1, characterized in that the difference between a guiding rail runner element and a damping rail runner element is at least partly owing to the fact that the rows of transverse load transmitting rolling members of said guiding rail runner element are in engagement with a track of said guiding rail runner element, which track exhibits a higher surface hardness than the corresponding track of a damping rail runner element.

5. The linear guiding apparatus of claim 1, characterized in that the difference between a guiding rail runner element and a damping rail runner element is partly owing to the fact that the rolling members of said guiding rail runner element and the rolling members of said damping rail runner element define in a cross-section orthogonal to the moving direction different engagement geometries with associated tracks of the respective rail runner element.

6. The linear guiding apparatus of claim 5, characterized in that, when viewed in a cross-section orthogonal to the moving direction, the rolling members of a damping rail runner element are capable of a larger frictional or/and a rolling displacement along a line of contact on the profile of an allocated track as compared with the rolling members of a guiding rail runner element.

7. The linear guiding apparatus of claim 6, characterized in that said rolling members are balls and that said rows of transverse load transmitting balls are guided on the associated rail runner elements in a track which has an approximately circular profile in a cross-section orthogonal with respect to the moving direction, and that said circular profile of said track on a guiding rail runner element has a smaller radius than the circular profile of said track on a damping rail runner element.

8. The linear guiding apparatus of claim 1, characterized in that both the guiding rail runner elements and the damping rail runner elements are at least partly free of frictional contact with said rail system.

9. The linear guiding apparatus of claim 1, characterized in that said object is guided on at least one rail of said rail system by guiding and damping rail runner elements arranged in series.

10. The linear guiding apparatus of claim 9, characterized in that said guiding and said damping rail runner elements are approximately symmetrically distributed within said series arrangement with respect to a longitudinal midpoint of said series arrangement.

11. The linear guiding apparatus of claim 10, characterized in that said series arrangement comprises a middle damping rail runner element and two terminal guiding rail runner elements.

12. The linear guiding apparatus of claim 10, characterized in that said series arrangement comprises a middle guiding rail runner element and two terminal damping rail runner elements.

13. The linear guiding apparatus of claim 9, characterized in that said object is guided on a plurality of preferably substantially parallel rails by guiding and damping rail runner elements.

14. The linear guiding apparatus of claim 1, characterized in that a rail runner element has a substantially U-shaped cross-section with one web and two legs located opposite to respective profile side faces of a profiled rail of said rail system.

15. The linear guiding apparatus of claim 1, characterized in that transverse load transmitting connection means between said object and said rail system, when seen in a transverse plane orthogonal with respect to said moving direction in a region of a damping rail runner element, are more easily deformable than transverse load transmitting connection means between said object and said rail system in a plane orthogonal with respect to said moving direction in a region of a guiding rail runner element.

16. The linear guiding apparatus of claim 1, characterized in that transverse load transmitting connection means between said object and said rail system, when seen in a transverse plane orthogonal with respect to said moving direction in the region of a damping rail runner element, exhibit after transverse vibration excitation by a defined exciting signal a faster vibrational amplitude attenuation than transverse load transmitting connection means between said object and said rail system in a transverse plane orthogonal with respect to said moving direction in the range of a guiding runner rail element.

17. The linear guiding apparatus of claim 1, characterized in that transverse load transmitting connection means between said object and said rail system, when seen in a transverse plane orthogonal with respect to said moving direction in the region of a damping rail runner element, have another characteristic frequency than transverse load transmitting connection means between said object and said rail system in a transverse plane orthogonal with respect to said moving direction in the region of a guiding rail runner element.

18. The linear guiding apparatus of claim 1, characterized in that at least one guiding rail runner element and at least one damping rail runner element each are separately located between said object and said rail system and are connected with said object.

19. The linear guiding apparatus of claim 1, characterized in that at least one guiding rail runner element is directly connected with said object and that at least one damping rail runner element is connected with at least one guiding rail runner element each.

20. The linear guiding apparatus of claim 1, characterized in that all roller paths of said rail system are set with rolling members of at least one guiding rail element as well as with rolling members of at least one damping rail element.

21. The linear guiding apparatus of claim 1, characterized in that the difference between a guiding rail runner element and a damping rail runner element is at least partly owing to the connection between the respective rail runner element and the object.

22. The linear guiding apparatus of claim 21, characterized in that at least one transverse vibration damping intermediate layer is provided between a damping rail runner element and said object and that in the connection between said guiding rail runner element and said object such an intermediate layer is either missing or if present exhibits different elasticity or/and damping characteristics.

23. The linear guiding apparatus of claim 22, characterized in that the damping intermediate layer comprises liquid chambers, the volumes of said liquid chambers being variable in opposite sense by vibrations in a plane orthogonal with respect to the moving direction, and that these liquid chambers are connected with each other by at least one damping channel.

24. The linear guiding apparatus of claim 23, characterized in that said liquid chambers are formed by recesses of said damping layer adjacent a respective contact face of a damping rail runner element and of an object.

25. The linear guiding apparatus of claim 22, characterized in that said intermediate layer is a liquid, particularly a high-viscosity oil.

26. The linear guiding apparatus of claim 25, characterized in that the liquid intermediate layer is limited in its area by layer edge limiting means.

27. The linear guiding apparatus of claim 26, characterized in that said layer edge limiting means are sealing means, particularly annular sealing means.

28. The linear guiding apparatus of claim 27, characterized in that said sealing means are elastic or plastic and elastic sealing means and are positioned in a sealing position by positioning means of said object or/and of said damping rail runner element.

29. The linear guiding apparatus of claim 22, characterized in that said intermediate layer consists of an elastomeric material, particularly of caoutchouc-elastic or plastic material.

30. The linear guiding apparatus of claim 22, characterized in that in addition to the transverse vibration damping intermediate layer spacer means are provided between said damping rail runner element and said object, which spacer means are stiffer than said transverse vibration damping intermediate layer.

31. The linear guiding apparatus of claim 22, characterized in that a transverse vibration damping intermediate layer between a damping rail runner element and said object is a coherence-promoting layer.

32. The linear guiding apparatus of claim 31, characterized in that said coherence-promoting layer is an adhesive layer.

33. The linear guiding apparatus of claim 21, characterized in that said transverse vibration damping intermediate layer is a compression force transmitting intermediate layer adapted to rest against a contact face of each said damping rail runner element and said object.

34. The linear guiding apparatus of claim 33, characterized in that said compression force transmitting intermediate layer is compressionally biased between said contact faces of said object and of said damping rail runner element.

35. The linear guiding apparatus of claim 34, characterized in that said contact faces of said object and of said damping rail runner element are biased towards each other until mutual abutment of respective spacer means provided between said object and said damping rail runner element.

36. The linear guiding apparatus of claim 21, characterized in that a damping rail runner element is frictionally connected with said object in at least one plane orthogonal with respect to the moving direction.

37. The linear guiding apparatus of claim 36, characterized in that said damping rail runner element is clamped in moving direction between two clamping elements which are attached to the object.

38. The linear guiding apparatus of claim 1, characterized in that the difference between said damping rail runner element and said guiding rail runner element is at least partly owing to the different materials of a main body of said damping rail runner element and a main body of a guiding rail runner element.

39. The linear guiding apparatus of claim 38, characterized in that the material of said main body of said damping rail runner element and the material of said main body of said guiding rail runner element differ from each other by their moduli of elasticity, the modulus of elasticity of said guiding rail runner element being greater.

40. The linear guiding apparatus of claim 39, characterized in that the material of said main body of said guiding rail runner element is steel and the material of said main body of said damping rail runner element is selected from the group consisting of light metals and hard-elastic plastics.

41. The linear guiding apparatus of claim 1, characterized in that the difference between a guiding rail runner element and a damping rail runner element is at least partly owing to the difference between the cross-sectional shape or/and the cross-sectional dimension of a main body of said guiding rail runner element and a main body of said damping rail runner element, said cross-sectional shape being viewed in a plane orthogonal with respect to the moving direction.

42. The linear guiding apparatus of claim 1, characterized in that a main body of said damping rail runner element is provided with at least one rigidity-reducing slit extending approximately along the moving direction and that in the main body of a guiding rail runner element a corresponding slit is either not provided or if provided is dimensioned differently or/and filled differently.

43. The linear guiding apparatus of claim 42, characterized in that said at least one rigidity-reducing slit of said main body of a damping rail runner element contains a filler which exerts an influence on the elasticity or/and the damping characteristics of said main body.

44. The linear guiding apparatus of claim 42, characterized in that said at least one slit of said main body of said damping rail runner element extends along the entire length of said main body in moving direction.

45. The linear guiding apparatus of claim 1, characterized in that the difference between a guiding rail runner element and a damping rail runner element is at least partly owing to a difference in supporting qualities of a main body of a guiding rail runner element on the one hand and of a main body of the damping rail runner element on the other hand for respective rows of transverse load transmitting rolling members.

46. The linear guiding apparatus of claim 45, characterized in that the difference between a guiding rail runner element and a damping rail runner element is at least partly owing to the fact that in case of a damping rail runner element a common prismatic subcarrier is provided, said subcarrier having respective rolling member tracks for load transmitting rolling member rows of mutually adjacent rolling member loops, said subcarrier further having prismatic side faces for being supported on respective supporting faces of a main body, said rolling member tracks and said prismatic side faces being shaped such that, when viewed in a plane orthogonal with respect to the moving direction, the resulting force transmission direction of a rolling member track defines together with a prismatic side face allocated to the rolling member track in terms of force transmission an angle δ, said angle δ being larger than 90°, more preferably larger than 120° and most preferably larger than 150°, and that in case of a guiding rail runner element the load transmitting rolling member rows of mutually adjacent rolling member loops are in engagement with tracks directly shaped on a respective main body or in engagement with tracks of a common prismatic subcarrier, said rolling member tracks and said prismatic side faces being located and shaped such with respect to each other on said prismatic subcarrier that, when viewed in a sectional plane orthogonal with respect to said moving direction, a resulting force transmission direction through one of the rolling member tracks defines an angle of approximately 90° with a prismatic side face which is allocated to said rolling member track in terms of force transmission to the main body.

47. The linear guiding apparatus of claim 45, characterized in that the difference in supporting qualities is at least partly owing to the fact that in case of a guiding rail runner element the row of transverse load transmitting rolling members travels on a track directly formed to the main body, while in case of a damping rail runner element the row of transverse load transmitting rolling members travels on a subcarrier which is supported on the main body.

48. The linear guiding apparatus of claim 47, characterized in that under the influence of vibrations said subcarrier is able to make a frictional micro movement relative to the respective main body.

49. The linear guiding apparatus of claim 47, characterized in that the material of the main body of a guiding rail runner element is more easily deformable or/and exhibits a longer vibrational amplitude attenuation time than the material of the main body of said damping rail runner element.

50. The linear guiding apparatus of claim 49, characterized in that the subcarrier is supported on the respective main body through at least one transverse vibration damping separating layer.

51. The linear guiding apparatus of claim 50, characterized in that said separating layer is received by a pocket of a contact face of said subcarrier or of said main body.

52. The linear guiding apparatus of claim 50, characterized in that in addition to said transverse vibration damping separating layer spacer means stiffer than said separating layer are provided between said main body and said subcarrier.

53. The linear guiding apparatus of claim 50, characterized in that said separating layer is made from rubber-elastic or plastic material.

54. The linear guiding apparatus of claim 50, characterized in that said pocket is open at its end portions spaced from one another in the moving direction.

55. The linear guiding apparatus of claim 50, characterized in that said pocket is closed along a peripheral edge of said separating layer.

56. The linear guiding apparatus of claim 50, characterized in that said separating layer is compressionally prestressed.

57. The linear guiding apparatus of claim 52, characterized in that said separating layer is compressionally prestressed such that respective spacer means of said subcarrier and of said main body are in mutual engagement.

58. A damping rail runner element for a linear guiding apparatus, this damping rail runner element having at least one rolling member loop for guidance along a runway rail, said damping rail runner element comprising at least one optionally profiled damping layer acting as a connecting layer between a main body of said rail runner element and an object to be attached.

59. The linear guiding apparatus of claim 1, wherein said damping rail runner element has at least one rolling member loop for guidance along a runway rail, said damping rail runner element comprising at least one main body having at least one slit weakening the cross-section of said main body.

60. The linear guiding apparatus of claim 1, wherein said damping rail runner element comprises at least one damping separating layer between a main body and a subcarrier supporting at least one row of transverse load transmitting rolling members.

61. the linear guiding apparatus of claim 1, wherein said damping rail runner element comprises at least one subcarrier for at least one rolling member row, said subcarrier being supported on an associated main body such that said subcarrier is capable of micro friction with respect to said main body in a plane orthogonal with respect to the moving direction.

* * * * *

UNITED STATES PATENT AND TRADEMARK OFFICE
CERTIFICATE OF CORRECTION

PATENT NO. : 5,553,945
DATED : September 10, 1996
INVENTOR(S) : Werner Blaurock et al.

It is certified that error appears in the above-indentified patent and that said Letters Patent is hereby corrected as shown below:

Col. 10, line 14, "FIG. 15" should read --FIG. 12--;
Col. 13, line 46, "12226a1 and 12226a2" should read --1222a1 and 1222a2--;
Col. 14, line 51, "16226a1, 16226a2" should read --1622a1, 1622a2--;
Col. 14, bridging lines 59-60, "16226a1, 16226a2" should read --1622a1,1622a2--;
Col. 15, line 50, "rail" should read --damping rail--;
Col. 20, line 58, "the linear" should read --The linear--.

Signed and Sealed this

Seventeenth Day of December, 1996

Attest:

BRUCE LEHMAN

Attesting Officer        Commissioner of Patents and Trademarks